Sept. 22, 1959     E. P. REPKE     2,905,349
LOADING AND UNLOADING MEANS FOR INDUSTRIAL TRUCKS
Filed Dec. 20, 1956     3 Sheets-Sheet 1
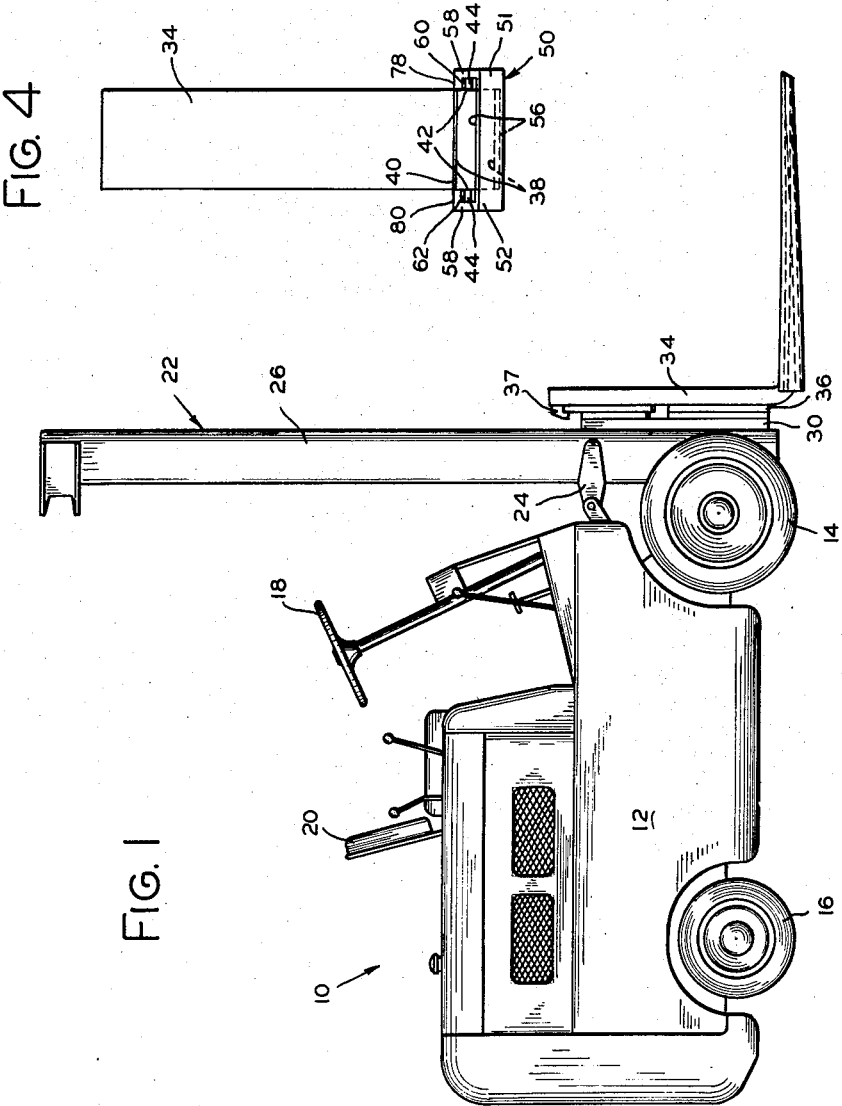
INVENTOR.
EDWARD P. REPKE
BY
ATTY.

Sept. 22, 1959 E. P. REPKE 2,905,349
LOADING AND UNLOADING MEANS FOR INDUSTRIAL TRUCKS
Filed Dec. 20, 1956 3 Sheets-Sheet 2
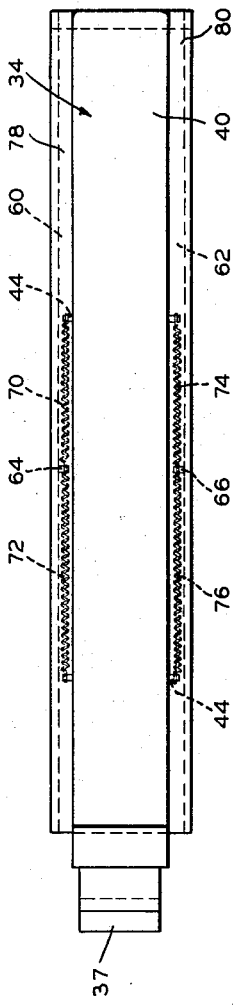
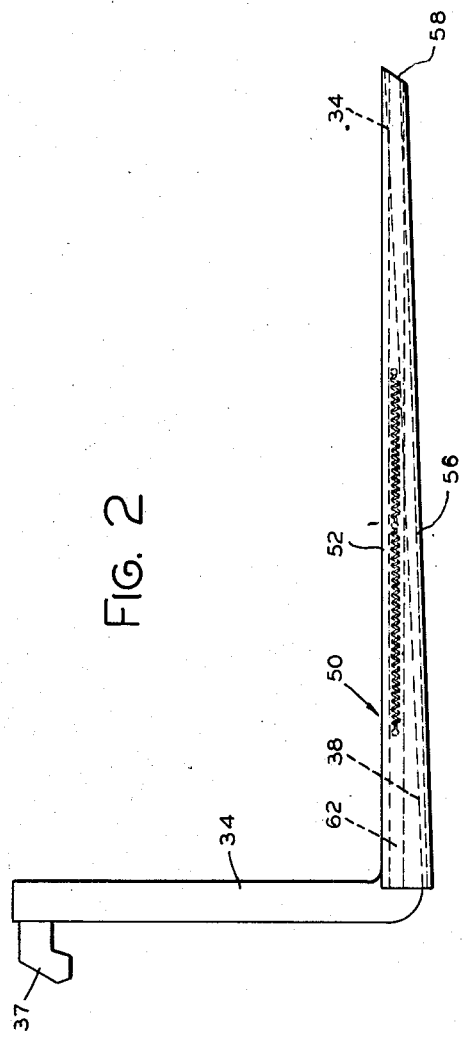
INVENTOR.
EDWARD P. REPKE
ATTY.

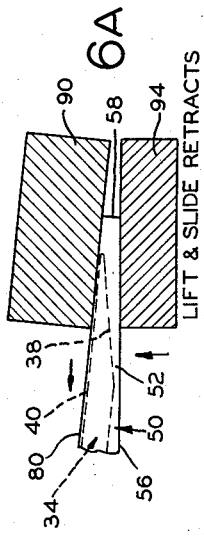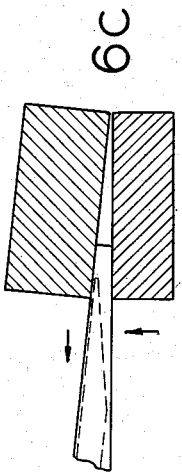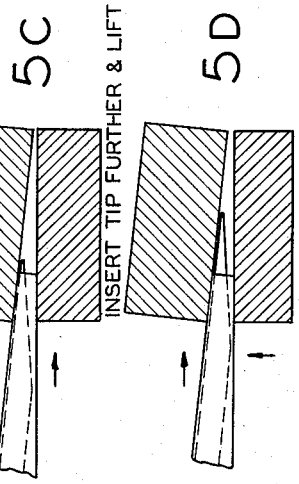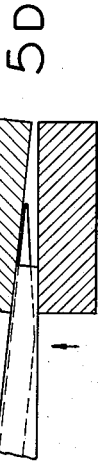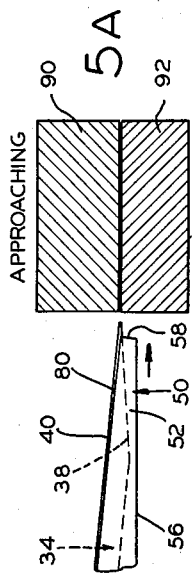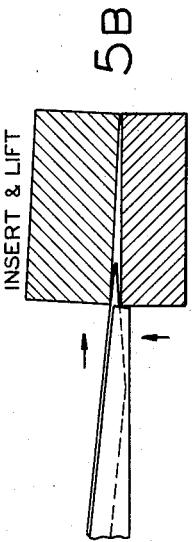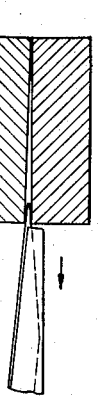

United States Patent Office 2,905,349
Patented Sept. 22, 1959

2,905,349

LOADING AND UNLOADING MEANS FOR INDUSTRIAL TRUCKS

Edward P. Repke, Coloma, Mich., assignor to Clark Equipment Company, a corporation of Michigan Application December 20, 1956, Serial No. 629,579

7 Claims. (Cl. 214—750)

This invention relates to loading means for industrial lift trucks, and more particularly to a novel combination of fork tine and sleeve for effecting palletless loading and unloading of objects.

It has long been a problem in the materials handling industry to devise a relatively simple and inexpensive attachment for an industrial truck which is capable of loading and unloading a variety of unpalletized objects. Such capability of an industrial truck attachment would substantially enhance the usefulness of the truck and decrease the indirect cost of operation thereof. For example, available storage space could be utilized more completely in warehousing operations if built-up wooden pallets could be eliminated as an element necessary to the application of industrial trucks to many material handling problems. Also, the cost of purchasing, storing and maintaining pallets could be eliminated by the use of such an attachment. In addition, in certain industries such as the lumber industry, it is impractical to palletize stacks of lumber; heretofore it has been necessary to manually drive a wedge between a portion of a vertical stack of lumber which it is desired to move and the portion of the stack therebeneath which is to remain in location.

Heretofore numerous attempts have been made to devise a relatively simple and inexpensive attachment of the above described type, but none have, to my knowledge, been successful.

I have devised an extremely simple and inexpensive device for use with industrial trucks for effectively solving the above problem.

It is therefore a primary object of my invention to provide a device for use with industrial trucks which is capable of loading, transporting and unloading a variety of non-palletized objects.

It is a further object of this invention to provide a load handling device which utilizes a plurality of load engaging surfaces associated with load engaging means for effecting a "walking-on" or "walking-off" motion of material being handled.

It is another object of this invention to provide an extremely simple and inexpensive but versatile and effective load handling means for loading and unloading non-palletized articles.

The foregoing and other objects and advantages will become apparent in view of the following description taken in conjunction with the drawings in which is shown a preferred embodiment of my invention.

In the drawings:

Figure 1 is a view in side elevation of a well-known type of industrial lift truck embodying my invention;

Figure 2 is an enlarged view in side elevation of the fork tine and sleeve combination which is connected to the truck in Figure 1;

Figure 3 is a top plan view of the device shown in Figure 2;

Figure 4 is a right hand end view in elevation of the fork tine and sleeve construction shown in Figure 2;

Figure 5 comprises a series of schematic drawings, viz., 5A, 5B, 5C and 5D, which illustrate the manner of using my device in a loading operation; and Figure 6 comprises a series of schematic drawings, viz., 6A, 6B, 6C and 6D, which illustrate the manner of using my device in an unloading operation.

In carrying out this invention, I utilize a sleeve member which bounds a fork tine or load engaging means on three sides thereof, and which is operatively connected to the fork tine by means of two pairs of longitudinally extending spring means, the members of each pair being normally in equilibrium.

The load engaging means is reciprocable relative to the sleeve means and is loosely mounted therein so that the load engaging surface thereof may be disposed above or below the upper flat load engaging edges of the sleeve means. Proper manipulation of the truck in forward and reverse in combination with controlled raising and lowering movement of the load engaging means on the mast of the truck will effect alternate engagement of the bottom surface of a load with the load engaging surfaces of the fork tine and sleeve, respectively, whereby to effect a "walking-on" or "walking-off" movement of the load relative to the truck. The direction of movement of a load relative to the truck, that is, toward or away from the truck, depends upon the particular sequence of movement control of the fork tines relative to the sleeve member, as will be more fully explained hereinafter.

Now referring to the drawings in detail, the numeral 10 indicates generally an industrial lift truck provided with a body portion 12. The body portion houses the prime mover for the truck, which may be an internal combustion engine, together with other devices and mechanisms as are usually provided in a vehicle of this kind. The vehicle is mounted on four wheels, including a pair of front wheels 14 and a pair of rear wheels 16. As illustrated, the front wheels 14 are the drive wheels whereas the rear wheels 16 are dirigible and are connected by a conventional steering linkage to an operator's steering wheel 18. The steering wheel 18 together with a seat 20 and the usual pedals and levers for operating the vehicle form the operator's station on the body of the vehicle.

At the forward end of the body portion of the machine is mounted a vertically disposed mast structure 22 which is pivoted at its lower end on the body portion of the vehicle. Suitable means such as hydraulic motors, which are connected to the mast by means of fittings 24, are provided for tilting the mast forwardly and rearwardly under the control of the operator in a well-known manner.

The mast construction illustrated is of the sliding telescopic type and includes an outer fixed upright guide portion formed by a pair of channels 26, one of which is shown in Figure 1, and an inner telescopic portion formed by a pair of channels, not shown, which are secured together in a suitable manner to form a unitary sliding structure. A load supporting carriage 30 operates up and down within the mast structure by means of rollers, not shown, which engage the inner pair of channels. The load supporting carriage 30 carries a pair of laterally spaced load engaging members or fork tines 34, one of which is shown in Figure 1, which may engage under a load for lifting it for transport and stacking. As discussed previously, the mast 22 is arranged to be tilted forwardly to facilitate loading and unloading material to be carried on the fork tines.

The fork tines and carriage means 30 are raised and lowered in a conventional manner by hydraulic hoisting means and associated chains and sprockets, not shown.

The fork tines are removably connected to a fork bar 36 by bracket means 37, said fork bar being rigidly attached, as by bolts, to carriage 30. The horizontally extending portion of each fork tine is of well-known chisel type wherein a lower surface 38 tapers upwardly and forwardly from the vertical leg of the fork tine to form a chisel-like tip with an upper surface 40. Mounted in longitudinally spaced relation along each side edge 42 of each fork tine are a pair of projections 44 which are rigidly connected to and which project transversely outwardly from the center portion of each of said edges. The pairs of projections 44 are preferably disposed in a single horizontal plane and are positioned relative to each other so that a line drawn to join the four projections on each fork tine would form a rectangle. The projections are preferably of circular cross-section, but may be of any shape desired.

A longitudinally extending sleeve 50 of substantially U-shaped cross-section and having upwardly extending legs 51 and 52 is dimensioned such that the forwardly extending leg of the fork tine may easily slide within the pocket formed thereby. The under surface 56 of the sleeve 50 tapers upwardly and forwardly at a lesser angle to the horizontal than does the under surface 38 of the fork tine 34. The forward edges 58 of the legs 51 and 52 are preferably biased from the vertical, as shown. Longitudinally extending channel means 60 and 62 are formed in the legs 51 and 52, and extending inwardly from and transversely of the sleeve 50 are projections or pin means 64 and 66 which are fixedly connected to the vertical surfaces of channel means 60 and 62, respectively.

The projections 64 and 66 are preferably centrally located relative to the ends of sleeve 50. The cross-sectional area of each of the projections 44, 64 and 66 is substantially less than the cross-sectional area of channel means 60 and 62, so that the forwardly extending leg of fork tine 34 may move upwardly and downwardly within sleeve 50, the extent of such movement being limited by the clearance between the periphery of said projections and the vertical width of said channel means.

Connected to projection 64 are the one ends of preferably equal rate tension springs 70 and 72, the opposite ends of which springs are connected to the longitudinally spaced projections 44 which are attached to the same side of fork tine 34. Tension springs 74 and 76, preferably identical to springs 70 and 72, are connected at the one ends thereof to projection 66 and at the opposite ends to adjacent projections 44.

From the above it will be seen that if no external force is applied to sleeve 50 to maintain the position thereof it will always assume a central position relative to the forwardly extending leg of the fork tine, as shown in Figures 2 and 3. The sleeve is maintained in this position by the equal and opposite forces exerted by the springs 70 and 72 on the one side and the springs 74 and 76 on the other side of the sleeve member.

Now if a force is applied to the edges 58 of the sleeve so as to prohibit forward movement thereof and the fork is actuated to slide forwardly in the sleeve, it will be apparent that the springs 70 and 74 will be extended and the springs 70 and 76 collapsed so that when the force applied to sleeve 50 is relieved the sleeve will be jerked forwardly to its previously neutral position as a result of the unequal spring forces temporarily applied thereto. When the fork tine and sleeve assembly is elevated above the truck supporting surface the surface 40 of the fork tine will be elevated slightly above the upper surfaces 78 and 80 of legs 51 and 52 of the sleeve. If a downward force is applied to the fork tine when the lower surface 56 of the sleeve is resting on a supporting surface, then the upper surface 40 of the fork tine will be disposed slightly below the surfaces 78 and 80 of the legs of the sleeve.

The variable relation of the upper surfaces 40 and 78, 80 of the fork tine and sleeve, respectively, is of paramount importance in practicing my invention. As pointed out hereinbefore, this variable relation exists, as illustrated, as a result of the clearance which is provided between the peripheries of the projections 44, 64 and 66 and the upper and lower surfaces of channel means 60 and 62. The fork tine may therefore be raised relative to the sleeve until the peripheral surfaces of the projections 44, 64 and 66 abut the upper surfaces of the respective channel means, and may be lowered relative to the sleeve until said surfaces abut the lower surfaces of said channel means. This particular construction is disclosed for illustrative purposes only, and I contemplate all equivalent structure as being within the scope of my invention, as defined in the claims appended.

Referring now to Figure 5, a typical sequence of loading operation is illustrated wherein a load unit 90 is engaged by and loaded upon the fork tines 34 without the use of a pallet.

In phase 5A of Figure 5 the load unit is shown tiered on top of a second load unit 92, which may be located at floor level or atop other load units. The fork tine and sleeve assembly, as illustrated in part, has been located adjacent the load units by means of truck 10 preparatory to loading the unit 90 thereon. The mast 22 is preferably tilted slightly forwardly so as to facilitate entry of the chiselled ends of the fork tines between the abutting surfaces of the load units. Forward movement of the truck and fork tine 34 from this position effects wedging movement of the chiselled end of the fork beneath the load 90 (phase 5B) while the face 58 of the sleeve 50 is located in abutting relation with the adjacent vertical face of load unit 92. During this latter phase of operation, springs 70 and 74 are extended and springs 72 and 76 collapsed in the previously described manner. The fork tine and sleeve assembly is then lifted on the mast 22 which tilts the load unit 90 as shown in phase 5C and permits the sleeve assembly 50, under spring action, to slide forwardly between the loads. The fork tine is then lowered relative to the sleeve assembly so that load engaging surface 40 is below load engaging surfaces 78 and 80, which permits the fork tine to be inserted beneath load 90 an additional amount as shown in phase 5D, following which the fork tine and sleeve assembly is again raised which permits additional forward movement of the sleeve as the load supporting surface shifts from surfaces 78 and 80 to surface 40. The above described sequence of operation is continued until the load 90 is fully engaged by the fork tines for transport to a given destination.

As will now be apparent, the operating relation between each fork tine and sleeve is essentially dependent upon alternately utilizing each fork tine and sleeve as a load supporting and wedging member in such a way that the load is "walked-on" the forks and sleeves, the need for load palletization being thereby eliminated. The pairs of springs are, of course, important to this construction only insofar as they provide a means for actuating the sleeve forwardly between the loads following successive wedging and lifting action by the fork tine.

When the load unit 90 has been transported to a desired destination, it may be unloaded without benefit of a pallet upon a load unit 94 by reversing the sequence of operation described above. Figure 6 illustrates a typical unloading environment wherein it is desired to unload unit 90 on top of a load 94. In phase A of Figure 6 the fork tine and sleeve assembly has been lowered upon the upper surface of load unit 94 and the unit 90 partially discharged with the fork tine, as shown, lowered and in retracted position relative to the sleeve. When the fork tine is in this position, the springs 72 and 76 are extended in tension and the springs 70 and 74 collapsed, whereby upon lifting movement of the fork and sleeve assembly as in phase 6B, the spring action will return the sleeve to neutral position as the supporting surface of the fork tine engages the load. From this position the assembly is again lowered as shown in phase 6C and the fork tine retracted within the sleeve as the load rests upon the supporting surfaces 78 and 80 thereof. Subsequent slight lifting of the load 90 by means of engagement between the tip portion of the fork and the edge of the load permits the springs to again retract the sleeve to neutral position wherein it is completely disengaged from between the loads 90 and 94, as shown in phase 6D. The truck is then backed away from the load and the tip portion of each fork tine completely disengaged from between the loads.

Although only a single embodiment of the invention has been particularly described, it will be understood that changes might be made in the form and arrangement of the parts without departing from the scope of the invention.

I claim:

1. Loading means for an industrial truck comprising a fork tine, elongated sleeve means having a generally U-shaped cross-section, said fork tine being movable longitudinally and vertically in and partially above the pocket of the U-shaped sleeve means, and resilient means connected to said sleeve means and to said fork tine for normally maintaining a predetermined positional relation between the sleeve means and the fork tine, said fork tine and sleeve means being each movable relative to the other.

2. An industrial truck having elongated sleeve means of substantially U-shaped cross-section, load engaging means extending forwardly of the truck and slidable longitudinally in the pocket of said sleeve means, and means resiliently connecting said sleeve means to the load engaging means, said load engaging means being also movable upwardly and downwardly in the pocket of said sleeve means such that at least a portion of the upper load engaging surface of the load engaging means may be disposed either above or below the upper horizontal surfaces of the legs of said U-shaped sleeve means.

3. In combination, an elongated load engaging means, elongated sleeve means bounding said load engaging means on three sides thereof, said load engaging means being longitudinally and vertically movable within said sleeve means, normally balanced resilient means connected to the load engaging means and to the sleeve means for maintaining the load engaging means in a neutral position within said sleeve means, a pair of longitudinally spaced anchor members on said load engaging means, and an anchor member on said sleeve means disposed intermediate said pair of spaced anchor members, said resilient means comprising a pair of normally balanced springs connected at the one ends thereof to said intermediate anchor member and connected at the opposite ends thereof to opposite ones of said pair of spaced anchor members.

4. In combination, an elongated load engaging member having an upper load engaging surface, an elongated and substantially U-shaped sleeve means having load engaging surfaces along the tops of the legs thereof, said load engaging member being axially slidable in the pocket of said sleeve means and vertically movable relative to the legs of said sleeve means, and opposed resilient means connecting the load engaging member to the sleeve means, said load engaging member and sleeve means together being adapted to actuate unpalletized articles longitudinally thereof by alternately sliding said load engaging member longitudinally of said sleeve means in opposition to said resilient means and raising and lowering the load engaging member relative to said sleeve means whereby to alternately dispose said upper load engaging surface of the load engaging member and said upper load engaging surfaces of the legs of the sleeve means in frictional engagement with a surface of an article being handled.

5. In an industrial truck having an elevatable mast section and carriage means mounted for vertical movement in said mast section, a fork tine mounted on said carriage means for movement therewith, elongated sleeve means having a generally U-shaped cross-section, a leg of said fork tine being disposable within the pocket recess of the sleeve means, an axially extending groove or channel means associated with each vertical leg of the U-shaped sleeve means, an anchor means connected to each leg of the sleeve means in the center portion thereof and extending inwardly from each said channel means, a pair of anchor means connected to and extending outwardly from each side of the pocketed leg of said fork tine and disposed in longitudinally spaced relation on opposite sides of said sleeve connected anchor means, and a pair of opposed springs connected at the one ends thereof to each of said first mentioned anchor means and at opposite ends thereof to each said pair of anchor means whereby to effect equalization of forces between said load engaging means and said sleeve means so that same are normally maintained in a predetermined neutral position.

6. A device as claimed in claim 5 wherein each of said anchor means is at least partially disposed within the confines of one of said channel means, said load engaging means being vertically movable a limited amount relative to said sleeve means whereby to alternately dispose a load engaging surface of the load engaging means above or below load engaging surfaces of the vertical legs of the sleeve means for aiding in effecting a walking-on or walking-off of a load relative to said load engaging means.

7. In combination, a load engaging leg having an upper load engaging surface, and a generally U-shaped sleeve means resiliently connected to the load engaging leg and receiving said leg within the pocket recess thereof for longitudinal and vertical movement relative thereto, at least a portion of said load engaging leg being movable above the upper portion of said sleeve means, said load engaging leg and said sleeve means being manipulatable to walk a load therealong.

References Cited in the file of this patent

UNITED STATES PATENTS

| | | |
|---|---|---|
| 2,451,226 | Kemp | Oct. 12, 1948 |
| 2,628,734 | Jannsen | Feb. 17, 1953 |
| 2,670,865 | Merrick | Mar. 2, 1954 |
| 2,788,909 | Kughler | Apr. 16, 1957 |